Feb. 26, 1957  W. S. VON ARX  2,782,638
TIDAL CURRENT METER
Filed Dec. 30, 1949

INVENTOR
WILLIAM S. VON ARX

BY  ATTORNEY

United States Patent Office 2,782,638
Patented Feb. 26, 1957

2,782,638

TIDAL CURRENT METER

William S. von Arx, Woods Hole, Mass., assignor to the United States of America as represented by the Secretary of the Navy Application December 30, 1949, Serial No. 135,911

3 Claims. (Cl. 73—187)

This invention relates to the instrumentation art, and more particularly to meters for providing information concerning underwater currents.

Obviously, a meter for underwater use must be designed to withstand such rigorous conditions as being immersed in salt water for extensive periods. The design most suited for such a purpose should have a minimum of moving mechanical parts. Further, electrical components, if such are utilized, should be carefully protected due to the conductive nature of the medium in which they operate, and the number thereof should be minimized to avoid frequent maintenance.

Accordingly, the general object of this invention is to provide a device for presenting information concerning underwater currents having simple mechanical structure combined with a minimum of electrical components beneath the surface of the water.

It is another object of this invention to provide a simple means of obtaining dependable readings on the strength of underwater currents.

Another object of this invention is to provide a novel tidal current meter.

With these objects in view, the invention resides in the elements as described in the following specification. The specification is accompanied by drawings in which.

The current meter of this invention consists of a freely mounted propeller driven by the action of a current of water passing axially of the propeller shaft. No mechanical connections are made to the propeller, but a small bar magnet is mounted at the tip of one of the propeller blades. On the tip of the propeller blade diametrically opposite the blade carrying the bar magnet, there is mounted a counterweight. A high-impedance coil is mounted in close proximity to the path taken by the magnet as the propeller rotates. Thus, the field of the magnet is intercepted by the turns of the coil at every revolution of the propeller, causing voltage to be induced in the coil. The pulsing of the signal wave is subaudible, but when interrupted at an audible frequency, a signal can be heard in earphones over the background noise of wind, waves, and ordinary ship's machinery. This voltage is carried to the observation point at the surface of the water by means of a two-conductor rubber covered cable. At the surface is a vibrator circuit connected in series with a pair of earphones. The output of the current meter is coupled into this circuit and modulates the output of the vibrator in such a fashion that the signal from the current meter becomes audible. To acoustically determine the propeller rotation rate, pulses are counted over an interval of time, usually one minute. With practice, high pulse rates may be counted by threes, fours, sixes, or even tens, up to the rate of 600 pulses per minute.

Figure 1:
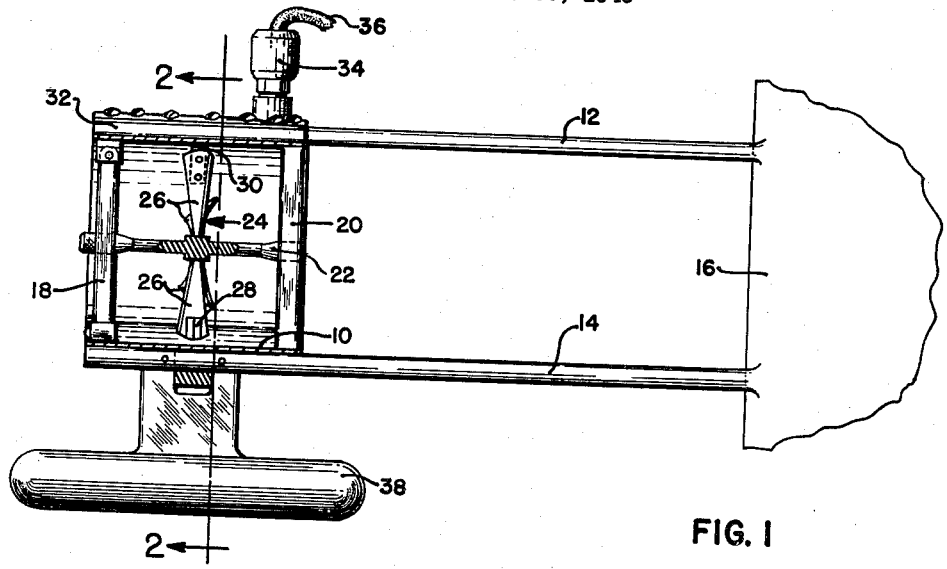
Fig. 1 is an elevational view and partial cross section of the meter.
Figure 2:
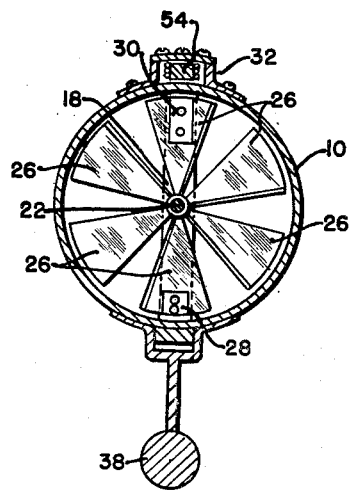
Fig. 2 is a cross section taken on the line 2—2 of Fig. 1.

Referring to the drawings, and particularly to Figs. 1 and 2, the cylindrical structure 10, herein called the guard ring, has rods 12 and 14 attached at diametrically opposite points on its periphery. These rods 12 and 14 extend axially and rearwardly in parallel relation and are fixed to a tailpiece 16. The tailpiece 16 is a tapered fin with the broadest section of the taper being attached to rods 12 and 14 and the thin edge of the taper at the rear. The function of the tailpiece 16 is to maintain the device in a position facing directly into the current of water in which it is suspended. A cylindrical balance weight member 38 is fixed to the rod 14 and projects downwardly therefrom to maintain the device in an upright position.

At diametrically opposite points on the guard ring 10 are mounted supports 18 and 20 in which a shaft 22 is pivotally mounted. The shaft 22 carries a propeller 24, having blades 26. Fastened at the outer tip of one of the propeller blades 25 is a magnet 28 and at the tip of the blade diametrically opposite the magnet is fastened a counterweight 30.

On the outer periphery of the guard ring 10 is a box 32 in which is mounted an inductor 54 comprising a core on which is wrapped a coil of high impedance as shown. Inductor 54 is disposed in such a manner, as illustrated in Fig. 2, that the field of the magnet 28 extending radially beyond the propeller tip cuts across the turns of the coil. As this magnetic flux intercepts the turns of the inductor 54 on each successive revolution of the propeller, an electromotive force is induced therein and conducted to the surface through the two leads in the watertight coupling 34 and the rubber covered cable 36.

Figure 3:
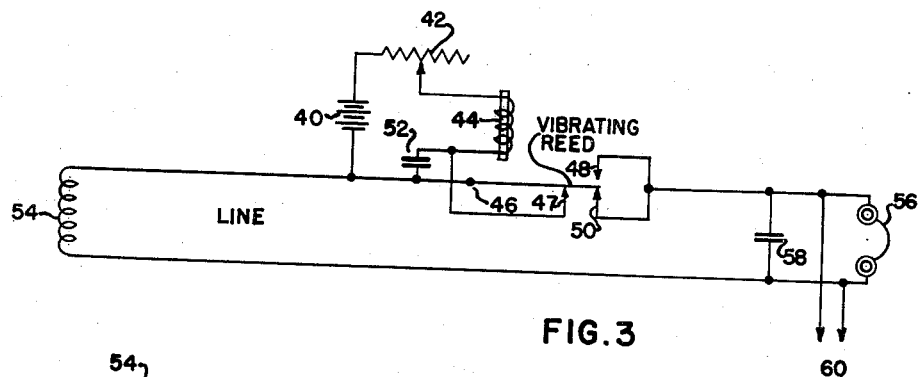
Fig. 3 is a schematic illustration of the circuit diagram of the recording means.

Referring now to Fig. 3, there is shown a vibrator circuit of conventional design composed of battery or other direct-current source 40, rheostat 42, solenoid 44, magnetic, resilient reed 46, and contact 47, all in series. Reed 46 makes contact on the upswing with contact 48 and on the downswing with contact 47 and contact 50. A condenser 52 is provided between reed 46 and contact 47 to minimize arcing. The current meter inductor coil 54 is connected in series with a pair of earphones 56, which are by-passed by a condenser 58, through either contact 48 or 50. The vibrator interrupter described above when in operation produces a staccato signal by making and breaking this series earphone circuit. The effect of the signal voltage from inductor 54 is to render audible in the earphones the clicking sound of the vibrator so that peaks of sound intensity can be noted as a basis for determining the velocity of water current activating propeller 24. The pulsed electrical signal appearing across earphones 56 may be applied to a suitable recording instrument (not shown) at leads 60, which instrument is calibrated in terms of the velocity of the current activating the propeller.

The invention is characterized by numerous features from which desirable adaptations may be drawn. There are no moving electrical components beneath the water nor are any of the other exposed parts vulnerable to the hazards arising from the intended use of the meter. The connecting cable from the meter to the indicating circuit aboard the ship may be designed to serve also as the suspension line for the meter. The electrical equipment is of the least complexity and may be made completely portable and self-powered. Modifications may be made in the electrical circuit to provide for electrical counting, or for a direct reading rate-of-flow meter indicating current speed continuously.

While what is described in the foregoing specification is at present considered the preferred embodiment of the invention, it will be apparent to those skilled in the art that several modifications may be made without departing from the scope of the appended claims.

What is claimed is:

1. A water current meter comprising, an open-ended cylindrical housing, support members disposed across the open-ends of said housing, a shaft axially disposed in said housing and rotatable in said support members, a propeller having a plurality of blades mounted on said shaft, a magnet attached to one of said blades, a counterweight attached to a propeller blade diametrically opposite the first-mentioned of said blades, a tapered fin attached to and extending axially rearward from said housing, a stabilizing weight attached to and extending radially downward from said housing, an inductor attached external to said housing, and vibrator-interrupter circuit means for indicating voltage intensity electrically connected to said inductor.

2. A tidal current meter for use beneath the surface of water comprising, an open-ended cylindrical housing, support members disposed across the open ends of said housing, a shaft axially disposed in said housing and journaled in said support members, a propeller having a plurality of blades mounted on said shaft, a magnet of a given weight attached to the tip of one of said blades, a counterweight also of said given weight attached to the tip of a second of said blades at a point diametrically opposite said magnet, a tapered fin attached to and extending axially rearward from said cylindrical housing, a stabilizing weight attached to and extending radially downward from said cylindrical housing, an auxiliary housing of watertight construction attached to and extending radially upward from said cylindrical housing, a coil within said auxiliary housing disposed adjacent the path of travel of said magnet, a cable, a pair of headphones and a vibrator interrupter circuit connected to said coil by means of said cable whereby voltage induced in said coil by said magnet is made audible in said headphones.

3. Apparatus as in claim 2 including a mechanical connector attached to said housing and surrounding said cable whereby said cable is adapted to suspend said cylindrical housing beneath said surface of the water.

References Cited in the file of this patent

UNITED STATES PATENTS

| | | |
|---|---|---|
| 575,455 | Berger | Jan. 19, 1897 |
| 1,363,267 | Porter | Dec. 28, 1920 |
| 1,869,884 | Curtis | Aug. 2, 1932 |
| 2,270,141 | Potter | Jan. 13, 1942 |
| 2,450,939 | Cor | Oct. 12, 1948 |
| 2,518,149 | Kearsley | Aug. 8, 1950 |

FOREIGN PATENTS

| | | |
|---|---|---|
| 571,003 | Great Britain | Aug. 1, 1945 |